(12) United States Patent
White et al.

(10) Patent No.: US 7,509,528 B2
(45) Date of Patent: Mar. 24, 2009

(54) TRANSACTION BUNDLING FOR IMPROVED REDUNDANCY

(75) Inventors: Tim White, Ottawa (CA); Brian Winger, Ashton (CA); Michel Kassab, Kanata (CA)

(73) Assignee: Alcatel Lucent, Paris (FR)

( * ) Notice: Subject to any disclaimer, the term of this patent is extended or adjusted under 35 U.S.C. 154(b) by 447 days.

(21) Appl. No.: 11/371,926

(22) Filed: Mar. 10, 2006

(65) Prior Publication Data

US 2007/0214385 A1 Sep. 13, 2007

(51) Int. Cl.
*G06F 11/00* (2006.01)
(52) U.S. Cl. ....................................... 714/13
(58) Field of Classification Search .................... 714/13, 714/15, 16, 18, 20, 6, 37, 38
See application file for complete search history.

(56) References Cited

U.S. PATENT DOCUMENTS

| 7,127,659 | B2 * | 10/2006 | Richardson et al. ......... 714/758 |
| 7,376,078 | B1 * | 5/2008 | Amiocangioli et al. ...... 370/217 |
| 7,392,424 | B2 * | 6/2008 | Ho et al. ......................... 714/4 |
| 2003/0046604 | A1 * | 3/2003 | Lau et al. ....................... 714/11 |
| 2004/0073828 | A1 * | 4/2004 | Bronstein ....................... 714/6 |
| 2004/0153624 | A1 * | 8/2004 | Zhou et al. ..................... 712/4 |

\* cited by examiner

*Primary Examiner*—Nadeem Iqbal

(57) ABSTRACT

A method is provided for simplifying maintenance of synchronicity between an active control system and a standby control system. As interdependent software modules on the active control system update stored state information in response to triggering events and actions, the transaction messages for dependent software modules are bundled together and sent to the standby control system as a single message. This avoids the problems that can arise when a switchover occurs when only some of the transactions messages from interdependent software modules have been transmitted before failure of the active control system.

6 Claims, 3 Drawing Sheets

TRANSACTION BUNDLING FOR IMPROVED REDUNDANCY

FIELD OF THE INVENTION

The invention relates to synchronization of redundant control systems having multiple dependencies, and in particular to transaction messaging within such synchronization.

BACKGROUND OF THE INVENTION

In redundant control systems, such as redundant control cards, synchronicity between the control systems is maintained by means of transaction messages. When the state of the system being controlled, such as a communications network, changes, software modules on the active control system are triggered to update stored state information. The software module also sends a transaction message to the standby control system, and in response the standby control system updates its version of the stored state information. For example, if a channel is created, a software module is called to populate the channel table entry. The software module also sends a transaction message to the standby control system to indicate the channel table entry change. The standby control system responds to this transaction message by populating its own channel table entry. In this way, when a switchover occurs, the newly active control system will have up to date information which accurately reflects the state of a system being controlled.

In systems having state dependencies, an event may trigger multiple transaction messages. In such systems, an event triggers a first software module to update state information and send a transaction message to the standby control system. The first software module also triggers a second software module responsible for maintaining state information which is dependent on the state information maintained by the first software module. The second software module updates the state information on the active control system, then sends its own transaction message to the standby control system. Continuing the example given above, once the first software module (a channel module) has populated the channel table entry, it may trigger the second software module (a forwarding module) to allocate a forwarding index for the new channel. The first software module and the second software module each send their own transaction message to the standby control system. Of course, there may be more than two levels of dependency, and the second software module may trigger a third software module with its own transaction message, and so on.

A problem can arise if a switchover occurs while transaction messages are being sent. The standby control system would then have incomplete state information. This can lead to various problems, such as incomplete state information or leakage of resources. For example, if the channel module above sent its transaction message but the transaction message of the forwarding module was not sent in time (i.e. before the active control system failed), then the standby control system (now the newly active control system) will act as if the channel has been created and may assume that the forwarding index has been allocated. It is only when use of the new channel is attempted will the absence of information become known and an error occur. If on the other hand it was the channel module that was unable to send its transaction message in time, then the standby control system will have processed the transaction message from the forwarding module and will have allocated a forwarding index for a non-existent channel. When the channel is created anew on the newly active control system, the channel module on the newly active control system will trigger a forwarding module and a new forwarding index will be allocated. This results in leakage of forwarding indices.

To overcome this risk, intra-module audits are carried out following a switchover. An intra-module audit examines the state information of a software module against each of its dependent software modules to determine whether all the interdependent state information is present, and to allocate or deallocate resources in an attempt to correct any deficiencies. However, intra-module audits can be extremely complex, since the dependencies between software modules are generally not as simple as in the example given above. Compounding the problem is that this complexity is called upon just after a switchover when there is no additional standby control system. The complexity is also hard to maintain and debug.

SUMMARY OF THE INVENTION

In accordance with one aspect of the invention, a method is provided for conveying updates of stored state information to a standby control system. Software modules are called, each of which updates a portion of the stored state information and each of which generates a transaction message reflecting the updated portion of the stored state information. The transaction messages from each software module are bundled into a single bundled transaction message. The bundled transaction message is transmitted to the standby control system. In one embodiment, a software module may pass its transaction message to a calling software module as part of a return value.

In accordance with another aspect of the invention, a method is provided for updating stored state information in a standby control system. A bundled transaction message is received from an active control system. Transaction messages are extracted from the bundled transaction message. At each of a number of software modules, a portion of the stored state information is updated in accordance with at least one of the transaction messages.

The methods of the invention may be in the form of software stored as instructions on computer-readable media.

The methods and apparatus of the present invention allow related transaction messages to be bundled and sent together. A standby control system is thereby able to recreate the state of the system being controlled completely, including all interdependent states for an event or update. This removes the need for intra-module auditing, greatly simplifying synchronization between the active control system and the standby control system, and enabling much smoother switchovers. The risk of software error is distributed over time instead of all at once just after a switchover. The software responsible for ensuring that dependencies between software modules are maintained runs all the time on the active control system during bundling of transaction messages, and receives better test coverage and soak time instead of a one-shot audit post switchover. The need for running a complex intra-module audit immediately after switchover is avoided. The risk of a failure of the standby control system due to an error in complex intra-module auditing, leaving the system with no system controls since the primary control system has just failed prior to the switchover, is minimized or even eliminated.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

According to one embodiment of the invention, an active control system includes software modules which perform actions that alter state information of a system being controlled by the control system. The alteration of the state information is conveyed to a standby control system in order to maintain synchronicity of stored state information between the active control system and the standby control system, although this conveyance is not necessarily by the software module that altered the state information.

Each software module may call other software modules or may be called by other software modules. The software modules are generally organized in a hierarchical manner. A first software module that calls a second software module is referred to as the calling software module of the second software module, and the second software module is referred to as a called software module of the first software module.

Figure 1:
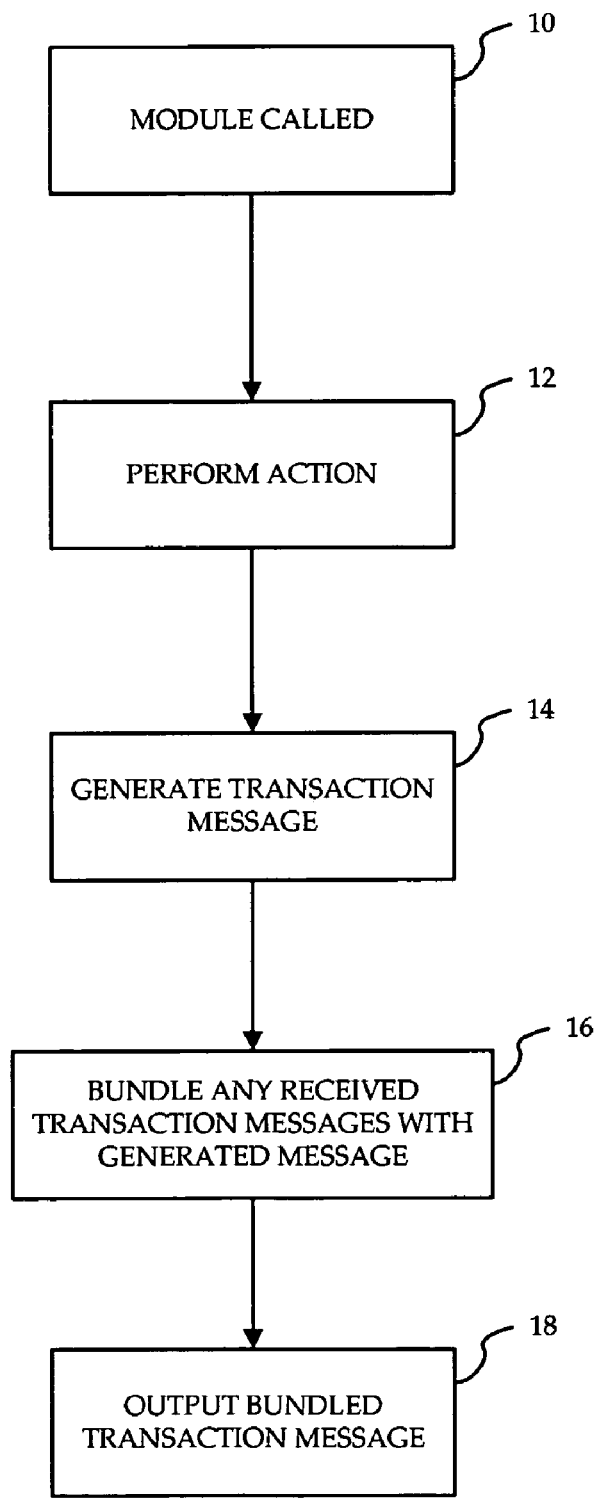
FIG. 1 is a flowchart of a method carried out by a software module on a control system according to one embodiment of the invention.

Referring to FIG. 1, a flowchart of a method carried out by a software module on a control system according to one embodiment of the invention is shown. At step 10 the software module is called. This may be by another software module, or by a network administrator. At step 12 the software module performs an action which updates the state information of the system being controlled by the control system. At step 14 the software module generates a transaction message for eventual use by the standby control system. The transaction message reflects changes to the state information made by the software module in performing the action at step 12.

At step 16 the software module bundles any transaction messages received from other called software modules with the transaction message generated at step 14. The called software modules will usually have been called as part of the action performed at step 12, but may more generally be called at any time at which the software module is designed to call called software modules. It should also be noted that there may not actually be any called software modules or any returned transaction messages, if this software module is at or near the bottom of the software module hierarchy for a triggering event.

At step 18 the software module outputs the bundled transaction message, which may include only this software module's transaction message if this software module is at or near the bottom of the software module hierarchy. The bundled transaction message will usually be output as a return value to be read by a calling software module at the calling software module's own execution of step 16. However, if this software module has no calling software module and is at the top of the software module hierarchy for a triggering event, then the bundled transaction message is output by transmitting the bundled transaction message to the standby control system. The nature of the output will depend on how the software module has been coded.

In this way, individual software modules do not transmit their own transaction messages independently to the standby control system. Rather, transaction messages within a software module hierarchy are bundled together as they are passed to calling software modules as part of return values. Only the top software module conveys information to the standby control system, and this is done by transmitting a bundled transaction message which includes transaction messages from all software modules which are eventually called as part of the software module hierarchy triggered by an event.

Figure 2:
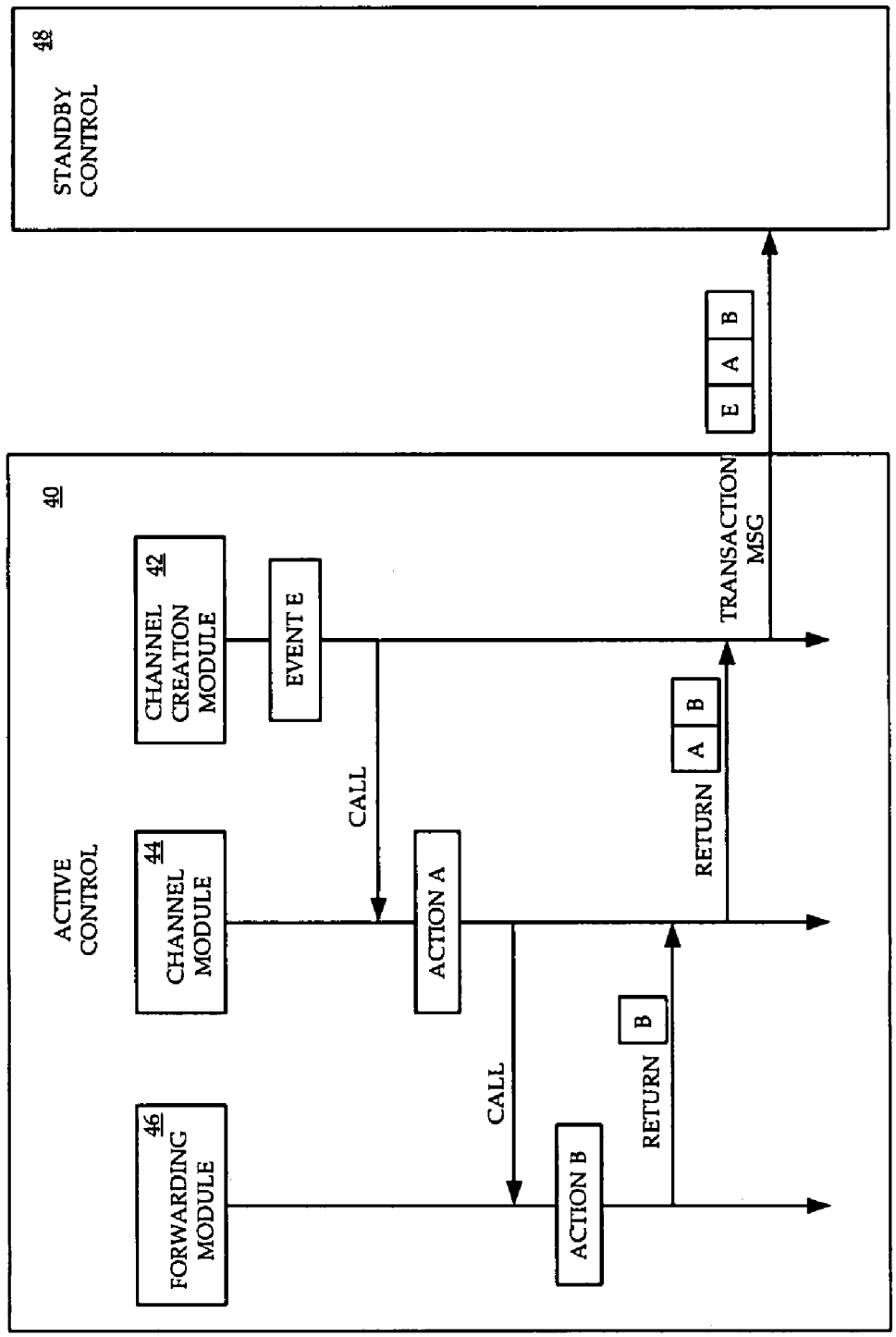
FIG. 2 is a messaging diagram of an example transaction messaging in an active control system according to one embodiment of the invention.

Referring to FIG. 2, an example series of transaction messages is shown in accordance with one embodiment of the invention. An active control system 40 includes three software modules: a channel creation module 42 which is a top software module triggered by an event; a channel module 44; and a forwarding module 46. Below each software module in FIG. 2 is a time line, with time progressing downward. The channel creation module 42 is triggered when a channel is created, such as by a network administrator. The channel creation module 42 notes the event, in particular that a new channel has been created. The channel creation module calls the channel module 44. The channel module 44 performs an action, namely populating a channel table entry. The channel module 44 then calls the forwarding module 46. The forwarding module 46 performs an action, namely allocating a forwarding index to the channel.

In performing this action, the forwarding module 46 generates a transaction message B. However, instead of transmitting this transaction message to a standby control system 48, the forwarding module 46 sends the transaction message to the channel module 44 as part of its return value. The channel module 44 receives the transaction message B and bundles it with its own transaction message A which was generated as a result of performing the action of populating the channel table entry. The channel module 44 sends the bundled transaction message to the channel creation module 42 as part of its return value. The channel creation module 42 bundles the received transaction messages AB with its own transaction message E which was generated as a result of performing the action of creating the channel. Because the channel creation module 42 is a top software module, it outputs the bundled transaction message EAB to the standby control system 48. The standby control system 48 then has complete state information relating to the triggering event of creating the new channel, and can update its own stored state information.

Figure 3:
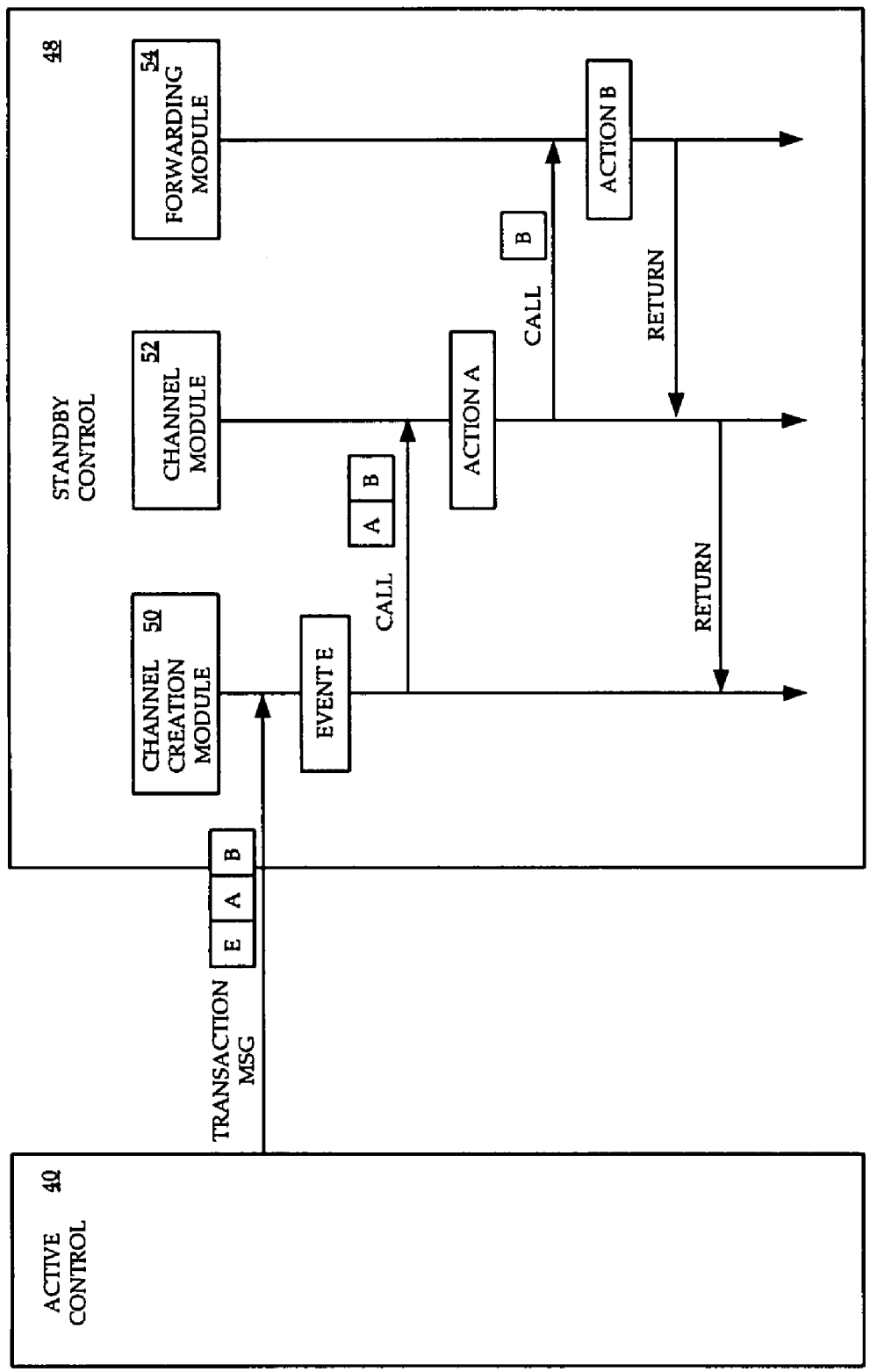
FIG. 3 is a messaging diagram of an example transaction messaging in a standby control system according to one embodiment of the invention.

Referring to FIG. 3, an example series of transaction messages within the standby control system according to one embodiment of the invention is shown. A channel creation module 50 within the standby control system 48 (similar to the channel creation module 42 within the active control system 40) receives the bundled transaction message EAB sent by the channel creation module 42 of the active control system 40. The channel creation module 50 extracts the transaction message E and notes the event by updating the state information stored on the standby control system 48 to reflect creation of the new channel. The channel creation module 50 then sends the partially debundled transaction message AB to a channel module 52 (similar to the channel module 44 on the active control system 40). The channel module 52 extracts the transaction message A and performs the corresponding action, namely populating a channel entry table as indicated by the transaction message A. The channel module 52 then sends the partially debundled transaction message B (containing at this point in this example only one transaction message) to a forwarding module 54 (similar to the forwarding module 46 on the active control system 40). The forwarding module 54 extracts the transaction message B and performs the corresponding action, namely allocating a forwarding index to the channel. The forwarding module 54 then sends a return to the channel module 52, which in turn sends a return to the channel creation module 50.

The invention has been described as software modules on an active control system. This has been for ease of explanation in order to identify one control system as an active control system and a separate control system as a standby control system. Since control systems may generally be either an active control system or a standby control system at any point in time, the invention will be understood more generally to related to software modules on any control system.

The embodiments presented are exemplary only and persons skilled in the art would appreciate that variations to the embodiments described above may be made without departing from the spirit of the invention. Methods which are logically equivalent to the method described above with reference to FIG. 1 are within the spirit and scope of the invention. The scope of the invention is solely defined by the appended claims.

We claim:

1. A method of conveying updates of stored state information to a standby control system, comprising:
    calling a plurality of software modules, organized in a hierarchy from a top software module to a bottom software module;
    updating, in each of the software modules, a portion of the stored state information;
    generating, in each of the software modules, a transaction message reflecting the updated portion of the stored state information;
    bundling the transaction message from each software module into a single bundled transaction message according to a position of each software module in the hierarchy; and
    transmitting the bundled transaction message to the standby control system, wherein only the top software module transmits the single bundled transaction message to the standby control system.

2. The method of claim 1 further comprising passing at least one generated transaction message from the software module which generated the transaction message to a calling software module as part of a return value.

3. A method of updating stored state information in a standby control system, the method comprising:
    receiving a bundled transaction message from an active control system, the bundled transaction message comprising messages for a plurality of software modules organized in a hierarchy from a top software module to a bottom software module;
    extracting a plurality of transaction messages from the bundled transaction message according to a position of each software module in the hierarchy; and
    at each software module, updating a portion of the stored state information in accordance with at least one of the plurality of transaction messages, wherein only the top software module receives the bundled transaction message from the active control system.

4. The method of claim 3 wherein extracting a plurality of transaction messages comprises at least one of the software modules extracting at least one of the plurality of transaction messages from the bundled transaction message leaving a partially debundled transaction message and passing the partially debundled transaction message to another of the software modules.

5. A computer-readable storage medium storing instructions which can be processed by a computer processor, the instruction comprising:
    instructions for performing an action which updates state information stored on a control system;
    instructions for generating a transaction message reflecting an update to the state information;
    instructions for receiving at least one transaction message from at least one called software module of a plurality of software modules organized in a hierarchy from a top software module to a bottom software module, the at least one transaction message received as part of a return value from each of the at least one called software module;
    instructions for bundling the at least one received transaction message with the generated transaction message into a bundled transaction message according to a position of each software module in the hierarchy; and
    instructions for outputting the bundled transaction message, wherein only the top software module outputs the bundled transaction message to a standby control system.

6. The computer-readable storage medium of claim 5 wherein the instructions for outputting the bundled transaction message comprise instructions for including the bundled transaction message as part of a return value.

* * * * *